J. V. MARTIN.
AERODYNAMIC STABILIZER.
APPLICATION FILED MAY 11, 1916.

1,334,707.

Patented Mar. 23, 1920.
3 SHEETS—SHEET 1.

Witness
Chas. W. Stauffiger
Charles Balg

Inventor
James V. Martin,
By
Attorneys

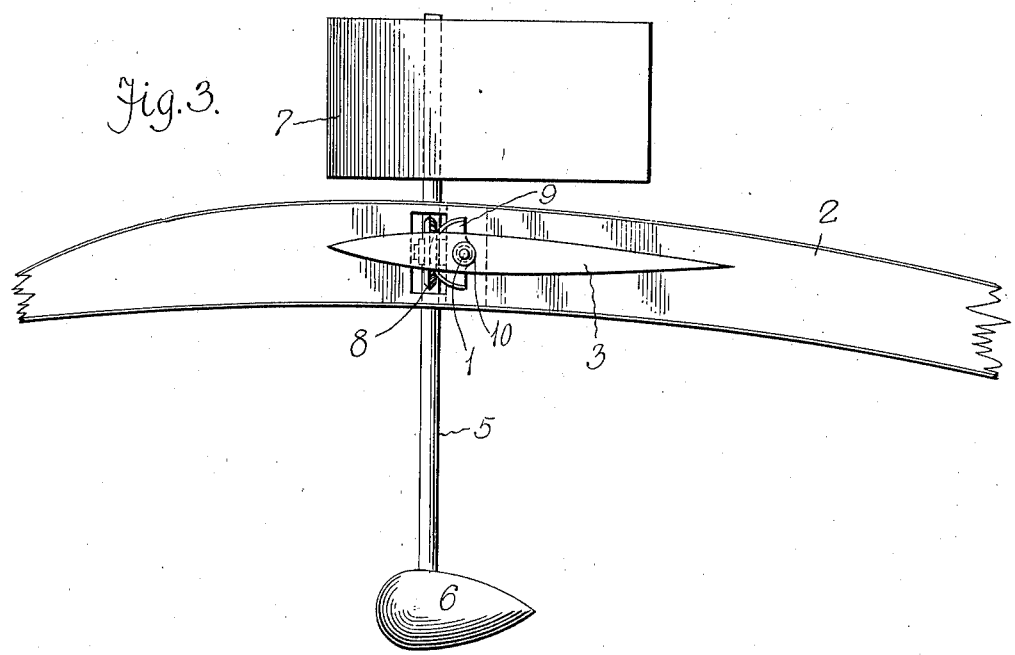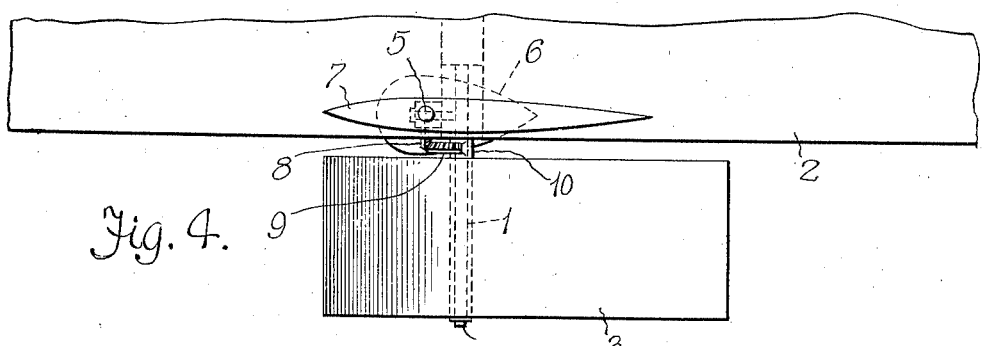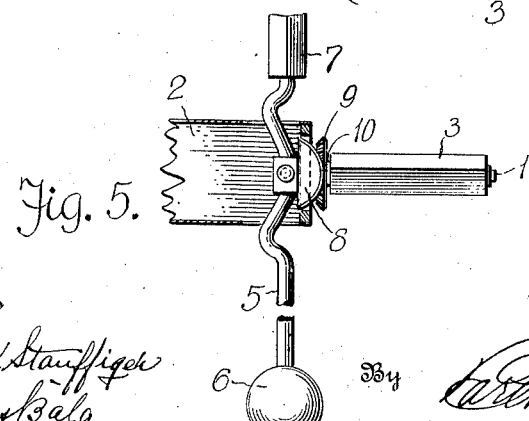

J. V. MARTIN.
AERODYNAMIC STABILIZER.
APPLICATION FILED MAY 11, 1916.
1,334,707.
Patented Mar. 23, 1920.
3 SHEETS—SHEET 3.
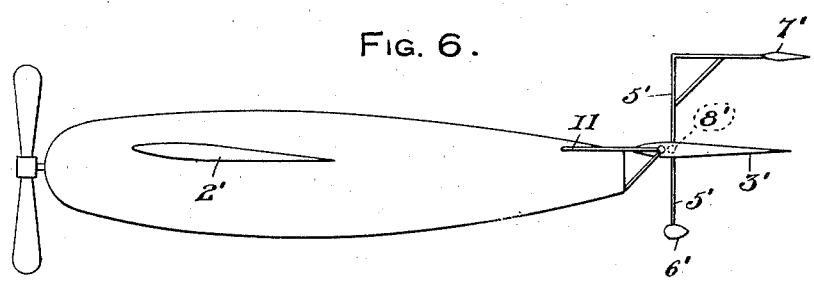
FIG. 6.
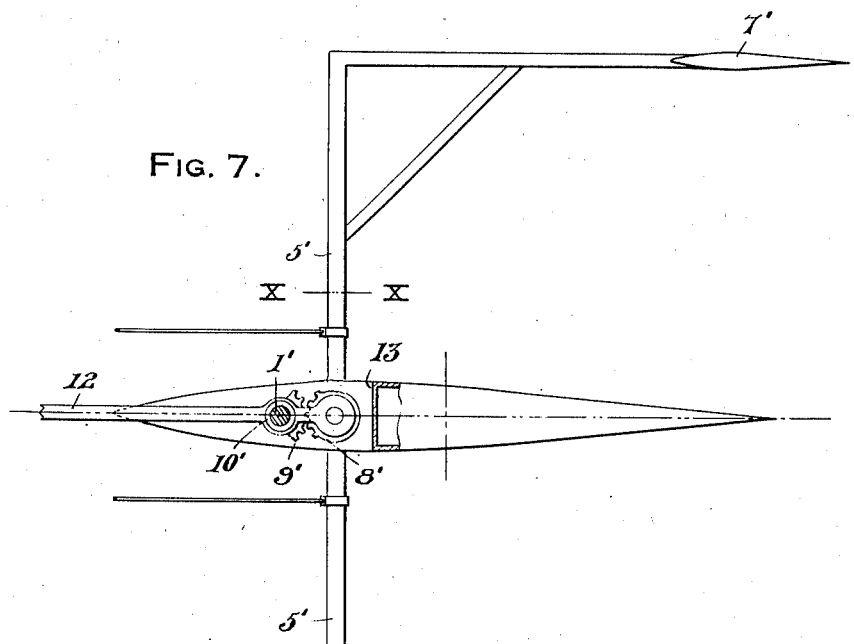
FIG. 7.
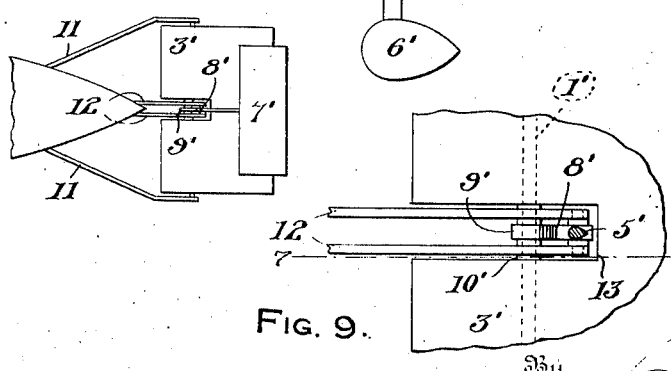
FIG. 8.
FIG. 10.
FIG. 9.
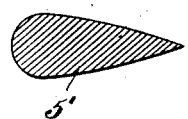
Inventor
James V. Martin
Attorney

UNITED STATES PATENT OFFICE.

JAMES V. MARTIN, OF DETROIT, MICHIGAN.

AERODYNAMIC STABILIZER.

1,334,707.  Specification of Letters Patent.  Patented Mar. 23, 1920.

Application filed May 11, 1916. Serial No. 96,749.

*To all whom it may concern:*

Be it known that I, JAMES V. MARTIN, a citizen of the United States of America, residing at Detroit, in the county of Wayne and State of Michigan, have invented certain new and useful Improvements in Aerodynamic Stabilizers, of which the following is a specification, reference being had therein to the accompanying drawings.

My invention aims primarily to provide means whereby any air craft is automatically maintained in a horizontal position relative to its lateral balance when proceeding on a straight course, that is, in a vertical plane of progression, as the device controls when the air craft is either ascending or descending.

A further object of my invention is to automatically bank an aeroplane on turns so that the chord of the wind section of an aeroplane will always be tangent to the curve of the machine's progression at substantially the center of pressure and thus prevent skidding.

It is a further object of my invention to provide an aerofoil section which creates practically the same lift and drift coefficients at small positive angles of incidence as it does at the corresponding negative angles of incidence.

It is a further object of my invention to place the vertical or anti-skidding aerofoil of my device in such position relative to the aircraft that it is free from "interference" of fuselage, propellers, motors, struts and the like and where it will be readily influenced by the oblique airs local to one or both extremities of the air craft.

It is a further object of my invention to eliminate so far as possible, the friction of operating parts in order that the inception of insensible oblique airs shall operate the mechanism and thus anticipate and counteract deflection of the aircraft from the normal.

The efficiency and dependability claimed for this device result from its extreme simplicity and from the utilization of forces already involved in aeroplane flight without the assistance of motors, springs or gyroscope.

The device may be described briefly as an aerodynamic stabilizer consisting of two movable parts, a stabilizer being fitted to each lateral extremity of the air craft.

The stabilizer is herein illustrated and described as attached to the wing of an aeroplane although it may be readily adapted to any sort of self-propelled air craft. By slight alteration the device may be made to provide for longitudinal as well as lateral automatic control.

The invention consists in the matters hereinafter set forth, and more particularly pointed out in the appended claims.

In the drawings,

Fig. 3 is a view in detail of a stabilizer and adjacent end portion of an aeroplane wing;

Fig. 4 is a plan view thereof; and

Fig. 5 is a view in detail of one form of operating connection between the parts of the device.

Fig. 6 is a side elevation of an aeroplane illustrating the adaptation of the device to automatic longitudinal control.

Fig. 7 is an enlarged side elevation of the device partially broken away taken substantially upon line 7—7 of Fig. 9.

Fig. 8 is a top plan view of the same.

Fig. 9 is an enlarged top plan view of a central portion of the device, and,

Fig. 10 is an enlarged sectional view taken upon line X—X of Fig. 7.

Figure 1:
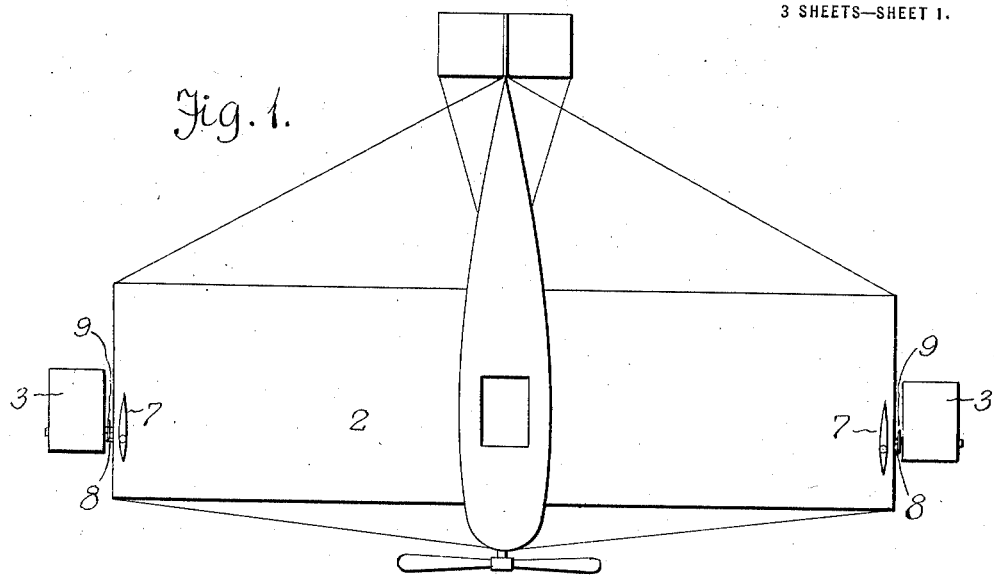
Figure 1 is a diagrammatic plan view of an air craft equipped with stabilizers embodying features of the invention.
Figure 2:
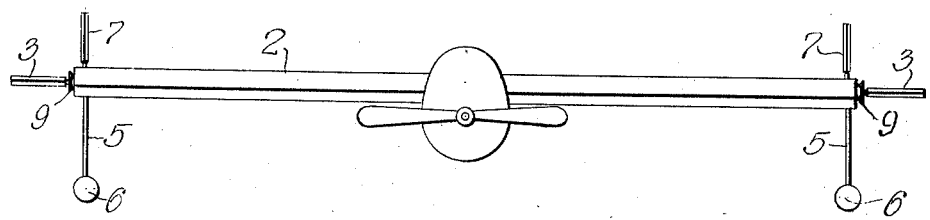
Fig. 2 is a view in front elevation thereof.

In the drawings, each extremity of an aeroplane of well known type, is provided with a member 1 extending from the end portion of the main plane 2 or other suitable part of the machine to which it is securely anchored. An aerofoil 3 of any wing section, but preferably of a design which creates equal head resistance, at similar but opposite angles, is supported tiltably on the member 1, preferably by ball bearing collars or the like, this axis of motion being located at or near the main center of pressure of the aerofoil for positive and negative angles of incidence through a range substantially of from zero to about sixteen degrees in either direction. Preferably also the axis of oscillation of the aerofoil 3 passes through the center of gravity of the aerofoil although this is not an essential requirement. Attention is called to the skin contour of aerofoil 3 as an important feature of my invention; it has practically the same curvature on both its convex skins.

A normally upright arm 5 is journaled on the machine in convenient proximity to the member 1, in such manner as to swing freely in a plane parallel to the member 1 and consequently transversely to the axis of oscillation of the plane 3. A pendulum weight 6 having a stream line contour or conformation is attached rigidly to the lower portion of the member 5, the latter passing upwardly through the skin of the main plane of the machine, or at any rate above the latter to afford support to an upright aerofoil 7 that is mounted on the member 5 in a plane substantially parallel with the longitudinal axis of the machine.

The member 5 and the auxiliary frame or aerofoil 3 are interconnected in such manner that the outward movement of the pendulum 6 causes the forward margin of the frame 3 to rise and a reverse motion of the pendulum causes the forward margin to lower. As herein shown, such interconnection may consist of a segmental gear 8 carried by the arm 5 in mesh with a segmental pinion 9 that is secured to the journal portion 10 of the plane 3. It is to be understood that the disposition of these interconnecting parts is in consonance with good mechanical construction and practice, the important feature being the location of the member 5 at the wing extremity in direct connection with aerofoil 3, thus eliminating the friction of leads and permitting aerofoil 7 to be influenced by the oblique relative airs local to one wing, and removing aerofoil 7 from positions near the center of the aeroplane where its usefulness would be ruined by the air "interference" caused by fuselage, motors, propellers, struts and the like.

It is also important to note that aerofoil 3 is supported on member 1 by bearings disposed within it, this being a great improvement over former practice since the bearings thus disposed take pressure evenly and do not bind as a result of wind pressure on aerofoil 3.

It is also to be noted that the upright aerofoil 7 is secured to the member 5 in such manner as to be supported at substantially its center of pressure. This center of pressure is prevented from shifting to any appreciable extent by the shape of the skin surfaces of the ailerons, both of which are cambered, or the aerofoil may be said to be double-cambered. This contour is better than any other wing section, in that the movement of the center of pressure is less than one-half that of other and standard sections. Furthermore it enables the housing of the member 5 which is completely and fully inclosed and therefore reduces the skin resistance of the aeroplane in flight.

With both extremities of the aeroplane equipped in this way, should the aeroplane deviate during flight from the lateral horizontal plane in however slight a degree, the weight 6, which acts freely under the influence of gravity and centrifugal force save for the friction of the auxiliary plane on its bearing, will cause the auxiliary plane that is on the low wing of the machine to take an increased angle of incidence and the corresponding weight that controls the plane on the high wing will decrease the angle of the latter plane.

Thus the effect of the stabilizer is to raise the low and depress the high wing without creating any unequal head resistance in the aeroplane.

Should the aeroplane become tilted and have a considerable lateral inclination so that it increases its speed in the direction of its inclination, then the upright aerofoils 7 will by the action of the air impinging on the surfaces thereof, accentuate the action of the weights 6 already communicated to the planes on the lower wing and high wing respectively.

Should the aeroplane be laterally horizontal in flight, and the steering rudder be operated to turn the aeroplane from its straight course, the pendulum weights 6 will tend to continue their motion in the original line of flight and will both swing toward that end of the plane which would describe the largest circle. This would cause the auxiliary aerofoil on the outer circle to take a larger angle of incidence and to consequently raise the outer wings, and the one on smaller or shorter circle, to take a negative angle and depress the inner wing. This is equivalent to banking the aeroplane for a turn, thus effecting automatically to a large degree the necessary operation of the plane in successful flight. Any skidding tendency of the aeroplane will cause pressure of air on the surface of the upright aerofoils and thus assist the pendulum weights in controlling the auxiliary planes properly.

Obviously, changes in the details of construction may be made without departing from the spirit of my invention and I do not care to limit myself to any particular form or arrangement of parts.

The adaptation of the device to the automatic maintenance of the aeroplane's longitudinal balance is illustrated in Figs. 6 to 10 both inclusive of the drawings, and will be briefly described.

The aeroplane illustrated in Fig. 6 is provided with main planes 2' while the empennage comprises a mounting member 1' supported by outer and inner brackets 11 and 12 respectively, while a horizontal rudder 3' is tiltably arranged upon the support 1', having a cut-away portion 13 arranged with the transverse hub 10', the said hub and rudder being journaled upon the support 1', An upright rod or arm 5' is journaled at a point above its center of gravity within the cut-away portion 13 upon the ends of the inner brackets 12 and is provided with a pendulum weight 6' at its lower end while an aerofoil 7' is rearwardly carried horizontally by the arm 5'. The arm 5' is of stream line construction as indicated by the cross-sectional view, Fig. 10, while coöperating segmental gears 8' and 9' are respectively, arranged upon the arm 5' and the hub 10'. The operation of the longitudinal stabilizer just described, will be apparent from the foregoing specification, the diving of the aeroplane automatically resulting in a negative incidence on aerofoil 7' depressing the latter and causing a negative incidence in rudder 3' while an ascending movement of the aeroplane will create a positive incidence on aerofoil 7' which will result in a positive incidence on the rudder 3' which will raise empennage until the aeroplane is again preceeding normally.

My invention includes means for utilizing variation in the direction and velocity of the air currents local to the wing to control the lateral balance of the aeroplane. Such conditions are called relative airs, meaning any change of the direction of the air from the normal, where a given incidence is assumed as normal. These different conditions are six in number, viz:—

1. Increased speed of air,
2. Decreased speed of air,
3. Up currents of air,
4. Down currents of air,
5. Right oblique airs,
6. Left oblique airs.

I claim as my invention:

1. In self-propelled air craft, end plane or planes tiltably mounted approximately on their combined centers of pressure and gravity to present both positive and negative angles between zero and substantially sixteen degrees, and automatic means for controlling the angle of the end planes to return the air craft to the horizontal, including a pendulum and coöperating aerofoil.

2. In combination with an aeroplane, two independent stability devices oppositely disposed but acting conjointly, one on the right and one on the left lateral extremity of the aeroplane, including independent pendulums and vertical aerofoils to operate the devices to depress the high wing and raise the low wing.

3. In combination with aeroplane wing extremities, a pendulum rod on each extremity connected with a tiltable aileron, and provided with an extension above its pivot center, and a vertical aerofoil on the extension to accentuate the action of the pendulum in maintaining the aeroplane's lateral normal balance by altering the incidence of the aileron.

4. In an aircraft, a pendulum rod on the lateral extremity thereof having an aerofoil on the upper end thereof above the pivot, operatively connected with an aileron to maintain the aeroplane's lateral balance.

5. In an aeroplane, an aileron at each lateral extremity thereof, and a pendulum arm at each lateral extremity thereof having at its upper extremity a vertical aerofoil above the pendulum pivot, said pendulum arm being operatively connected to the corresponding aileron.

6. In combination with a longitudinal extremity of an aeroplane, a normally vertical rod, a rearwardly extending arm provided at one extremity of the rod, a horizontally disposed aerofoil rigid with said arm, a rudder shiftably mounted adjacent said arm and operative connections between said rod and rudder, the said rod being pivoted at a point above its center of gravity.

7. In an aeroplane, a pendulum rod at the lateral wing extremity thereof pivoted to swing on an axis approximately parallel to the line of flight, a vertical aerofoil upon said rod, an aileron journaled to tilt about a supporting arm disposed within the aileron and operative connections between the said rod and aileron.

8. In combination with the wing extremity of an aeroplane and located in proximity thereto, an aileron pivoted on a transverse axis, a normally vertical rod pivoted to swing on a fore and aft axis, an aerofoil disposed on said rod, and operating connections between the said rod and aileron.

9. In combination with an aeroplane wing extremity, an arm rigid with the wing with an extension of said arm arranged beyond said wing extremity, and an aileron inclosing said arm extension as the aileron's supporting axis.

10. In an aeroplane, an aileron disposed laterally beyond the aeroplane wing extremity, a journaled portion rigid with said aileron, and a supporting axis for the aileron rigid with the aeroplane wing disposed within said journaled portion of the aileron.

11. In combination with the wing extremity of an aeroplane and located in proximity thereto, a pivoted and normally vertical rod provided above its pivot point with an aerofoil, an aileron and operative connection between said rod and said aileron to maintain the aeroplane in lateral balance.

12. In an aeroplane, an aileron disposed laterally beyond the aeroplane wing extremity, a supporting axis for the aileron rigid with the wing and disposed in journaled relations with the aileron, a pendulum rod upon the wing extremity, a vertical aerofoil upon said rod and movement imparting connections between said rod and aileron for maintaining the lateral balance of the aeroplane.

13. In an aeroplane having a wing, a supporting axis projecting from the wing extremity, a horizontal aileron journaled upon said axis, a normally vertical rod pivoted adjacent said axis, a vertical aerofoil upon said rod and operative connections upon said rod and aileron whereby the aeroplane is adapted for maintenance in normal lateral balance.

14. In combination with an aeroplane wing, a double convex symmetrical aileron upon the extremity of the wing, a pendulum rod swingingly mounted upon an axial point inclosed within the said wing and operative connections between said rod and aileron.

15. In combination, a double convex symmetrical aileron, a pendulum rod operatively connected thereto, and a weight at the lower extremity of said pendulum rod.

16. An aileron pivoted on a transverse axis, a normally vertical rod pivoted to swing on a fore-and-aft axis, an aerofoil disposed on said rod, and parts rigid with said rod engaging parts rigid with said aileron to operate the said aileron.

17. In an aeroplane, an aileron with the mass thereof so disposed as to place its center of gravity at approximately its center of pressure throughout small angles of incidence thereof, and means operated by airs local to said aileron for effecting a change in the incidence of said aileron.

18. In an aeroplane, a pivoted double-convex control aerofoil so weighted at or forward of its leading edge that its center of gravity is substantially coincident with its center of pressure and pivotal support throughout small angles of incidence thereof, and means for effecting a change in the incidence of said aerofoil.

19. In an aeroplane, a double-convex aerofoil weighted at or near its leading edge so as to place its center of gravity and its center of pressure approximately at its axis of support, and means for automatically effecting a change in the incidence of said aerofoil.

20. In an aeroplane, an aileron, a pivotally supported and weighted arm operatively connected to said aileron to turn the same upon swinging movement of said arm, a vertical aerofoil on a portion of said arm above its axis of support, and a weight at or forward of the leading edge of said aileron to maintain its center of gravity at the axis of the aileron support.

21. In an aeroplane, pivotally supported ailerons, and automatic means pivotally supported adjacent the pivotal support of said ailerons for operating said ailerons to maintain lateral balance, said ailerons being each weighted forwardly of its supporting axis and the axis of said automatic means to place the center of gravity of said stabilizing system substantially on the axis of support.

22. A symmetrical double convex aileron having its greatest camber and its axis of support approximately one-third the distance of its cord from the leading edge of the aileron.

23. A symmetrical double convex aileron having its greatest camber approximately one-third the distance of its cord from the leading edge of the aileron.

24. An aileron of varying camber having symmetrical upper and lower skins with its center of pressure for small angles of incidence and its axis of support at its greatest camber.

25. A double convex symmetrical aileron, having a substantially constant center of pressure at small incidence and its axis of support approximately coincident with said center of pressure.

26. In combination with an aeroplane wing extremity, a normally vertical rod carried by the wing and adapted for lateral movement, and a wing influencing fin provided on the rod exteriorly of the skin of said wing extremity.

27. In combination with the wing extremity of an aeroplane, a normally vertical rod pivoted on the wing free to swing in at least one direction, a shape of stream-line contour provided on the lower portion of the rod and a wing influencing fin on the upper portion of the rod.

28. In combination with the wing extremity of an aeroplane, a double convex symmetrical fin supported at the wing extremity inclosing its support at approximately its center of pressure, an aileron supported at the wing extremity, and operative connections between the said fin and aileron to alter the incidence of the aileron.

In testimony whereof I affix my signature in presence of two witnesses.

JAMES V. MARTIN.

Witnesses:
C. R. STICKNEY,
ANNA M. DORR.